United States Patent [19]
Bullock et al.

[11] Patent Number: 5,316,421
[45] Date of Patent: May 31, 1994

[54] USER FRIENDLY WHEEL CHOCK SYSTEM

[75] Inventors: Robert L. Bullock, Antioch; Armand P. Taillon, Chicago, both of Ill.

[73] Assignee: Standard Car Truck Company, Park Ridge, Ill.

[21] Appl. No.: 968,289

[22] Filed: Oct. 29, 1992

[51] Int. Cl.⁵ .............................................. B60P 3/07
[52] U.S. Cl. ........................................ 410/9; 410/30;
410/10; 410/20; 410/12
[58] Field of Search ............... 188/32; 410/3, 4, 7–12, 410/16, 19–21, 30, 49, 50, 55, 100, 103

[56]  References Cited
U.S. PATENT DOCUMENTS

| | | | |
|---|---|---|---|
| 4,786,223 | 11/1988 | Crissy et al. | 410/20 |
| 4,875,813 | 10/1989 | Moyer et al. | 410/9 |
| 5,106,245 | 4/1992 | Fritz et al. | 410/9 |
| 5,108,237 | 4/1992 | Zankich | 410/21 |
| 5,160,223 | 11/1992 | Seitz | 410/10 X |

FOREIGN PATENT DOCUMENTS 311543 4/1989 European Pat. Off. .............. 410/10

Primary Examiner—Michael S. Huppert
Assistant Examiner—Stephen Gordon
Attorney, Agent, or Firm—Lloyd L. Zickert

[57]  ABSTRACT

A wheel chock for restraining a motor vehicle in a transportable carrier such as a railway car, which is adapted to be selectively connected to a rail fastened to the floor of the carrier and which is made of a flexible copolymer material capable of withstanding the loads incurred by chock restrained vehicles, and further which is user friendly in that it can be maintained in a wheel-restraining position together with a wheel harness and removed from that position without the use of any tools. The wheel chock includes a torque tube for winding up a wheel harness strap to tighten the wheel harness on a vehicle wheel, a strap take-up device for quickly removing the slack in the strap, and a foot-operated actuating lever for rotating the torque tube and operating a pawl and ratchet mechanism controlling rotation of the torque tube.

18 Claims, 5 Drawing Sheets

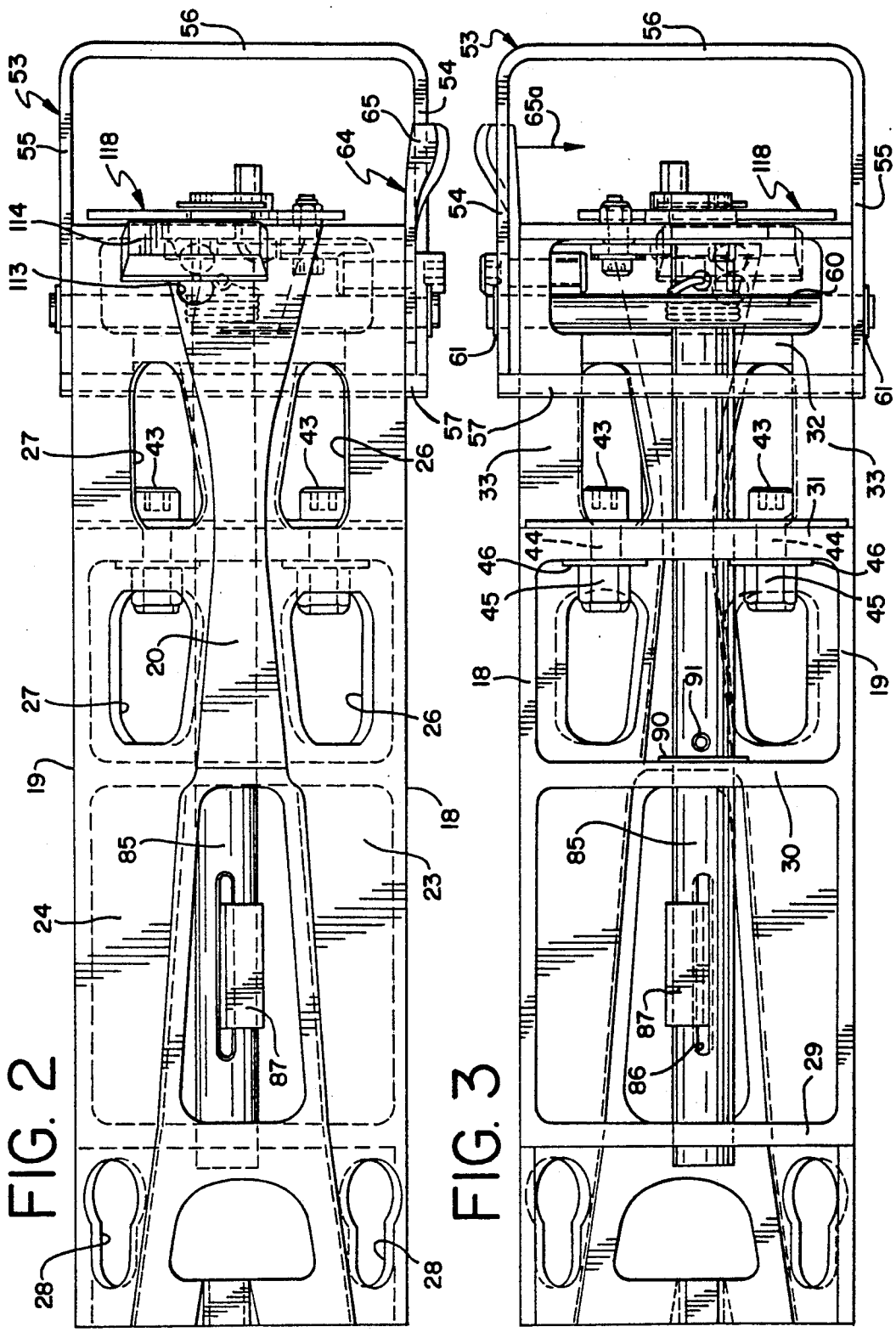

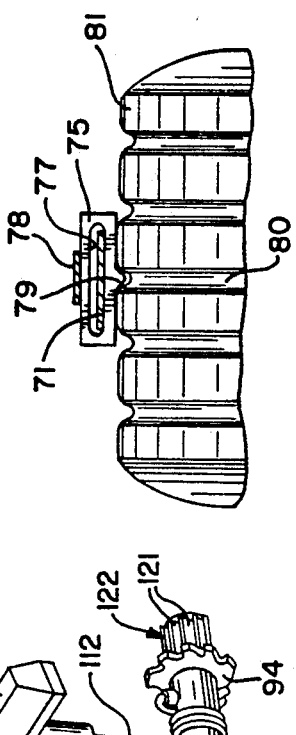
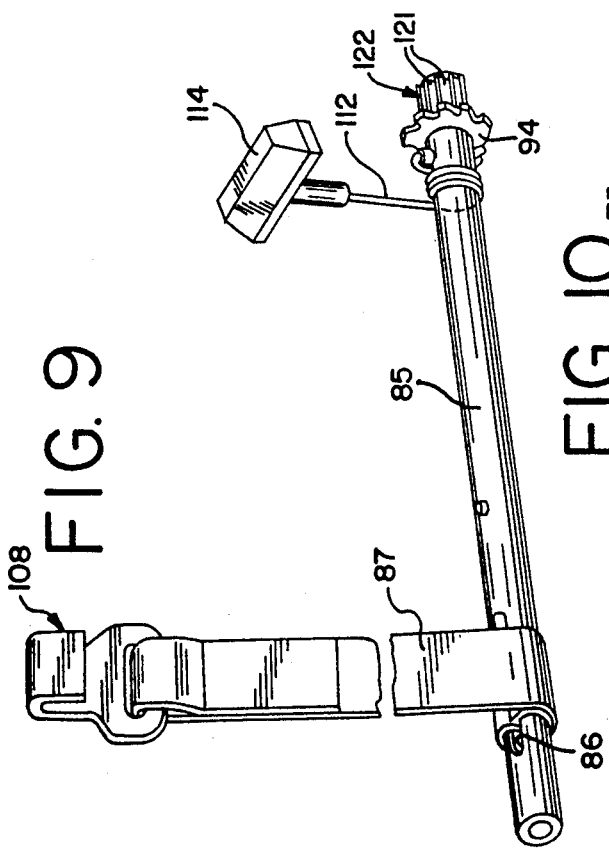
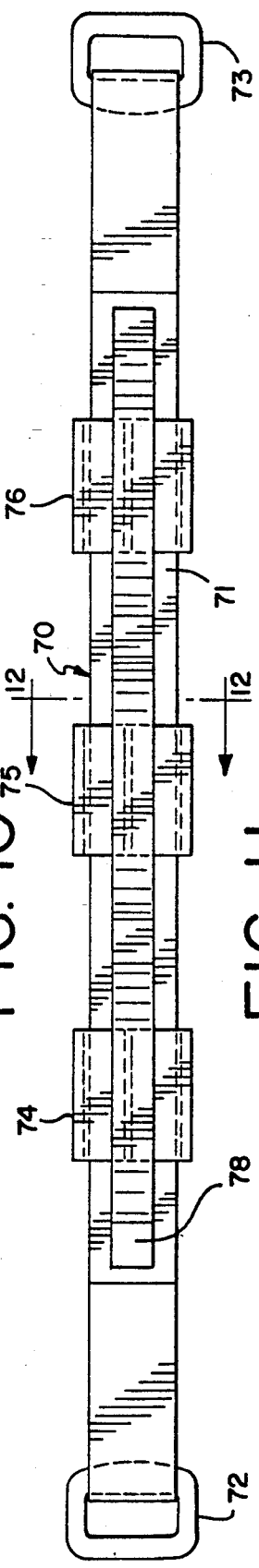
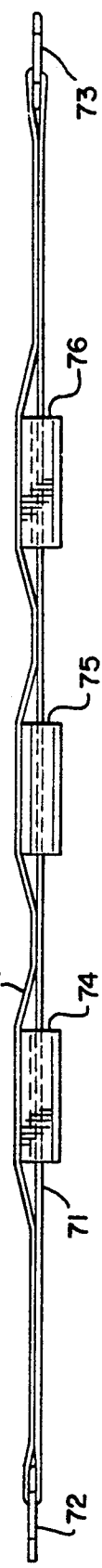

USER FRIENDLY WHEEL CHOCK SYSTEM

DESCRIPTION

This invention relates in general to a wheel chock for use in transportable carriers such as railway cars for restraining vehicle wheels and for coacting with a wheel harness, and more particularly to an improved wheel chock that is self-contained so that it can be handled without resort to additional tools, and more particularly to a wheel chock that can be quickly and easily manipulated and mounted to coact with a wheel harness for restraining vehicle movement.

BACKGROUND OF THE INVENTION

Wheel chocks for restraining the movement of motor vehicles such as automobiles, sport trucks, or other wheeled vehicles, in transportable carriers such as railroad cars are well known. More generally, these wheel chocks have required special handling when mounting them in relation to a vehicle wheel. For example, tools are often required in order to either mount the chock in place against a vehicle wheel or control the tension on a wheel harness.

It has also been known to construct wheel chocks from flexible plastic material, as seen in U.S. Pat. No. 4,875,813.

SUMMARY OF THE INVENTION

The wheel chock of the present invention is an improvement over the wheel chock of U.S. Pat. No. 4,875,813 in that it is user friendly and can be quickly and easily connected and tightened to a wheel harness without the use of tools. Further, the wheel chock of the invention may be easily removed and disconnected from a wheel harness without the use of tools.

The wheel chock of the invention is generally constructed like the wheel chock of U.S. Pat. No. 4,875,813 but is improved in that the slack in the wheel harness strap can be quickly taken up. Tension in the strap or tightening is accomplished by manipulation of a pivotally mounted foot-operated lever mounted on the chock body and thereafter the tension may be quickly and easily released by manipulation of the foot-operated lever during the harness disconnecting procedure.

The wheel chock of the invention includes a torque tube onto which is wound one end of the wheel harness strap during tightening of the strap. A ripcord device is associated with the torque tube and includes a handle which can be easily grasped for pulling of the ripcord to quickly take up the slack of the wheel harness strap. A pawl and ratchet mechanism is provided for the torque tube to prevent unwinding of the torque tube after the wheel harness strap slack has been removed and thereafter when further rotation of the tube is accomplished for tightening the strap. This foot-operated lever also includes a cam or actuating arm for engaging the pawl of the pawl and ratchet mechanism for releasing the pawl when it is desired to release the tension on the wheel harness strap.

The foot-operated lever also includes ratchet teeth to coact with a ratchet on the torque tube for tightening the wheel harness strap after slack has been removed. A unique feature of the foot-operated lever disengages the ratchet teeth when the lever is operated to release the pawl of the torque tube pawl and ratchet mechanism. Thus, the chock of the present invention is self-contained for mounting and operation and does not rely on the use of any tools when handled to be placed in vehicle restraining position and removed from that position.

It is therefore an object of the present invention to provide a new and improved wheel chock for chocking motor vehicles in transportable carriers which is self-contained and not dependent upon the use of other tools for use.

It is a further object of the present invention to provide a wheel chock that includes a wheel harness strap for use with a vehicle wheel harness and mechanism for taking up and tightening the strap which can be quickly and easily operated without the use of tools.

A still further object of the present invention is in the provision of an improved wheel chock including a wheel harness strap and a ripcord device for quickly taking up the slack of the strap.

A further object of the present invention is in providing an improved wheel chock having a wheel harness strap take-up and tightening mechanism and a foot-operated lever for operating the mechanism.

Another object of the invention is to provide an improved wheel chock having a wheel harness strap and foot-operated means for releasing strap tension.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 2 is a top plan view of the wheel chock of FIG. 1;

FIG. 3 is a bottom plan view of the wheel chock of FIG. 1;

FIG. 9 is a perspective view of the torque tube removed from the body of the chock and illustrating the relationship between the wheel harness strap and ripcord;

FIG. 10 is a plan view of a wheel harness;

FIG. 11 is a side elevational view of the wheel harness of FIG. 10; and

FIG. 12 is a sectional view taken through the wheel harness substantially along line 12—12 of FIG. 10 and illustrating the relationship between one of the wheel harness pads and a vehicle tire.

DESCRIPTION OF THE INVENTION

Figure 1:
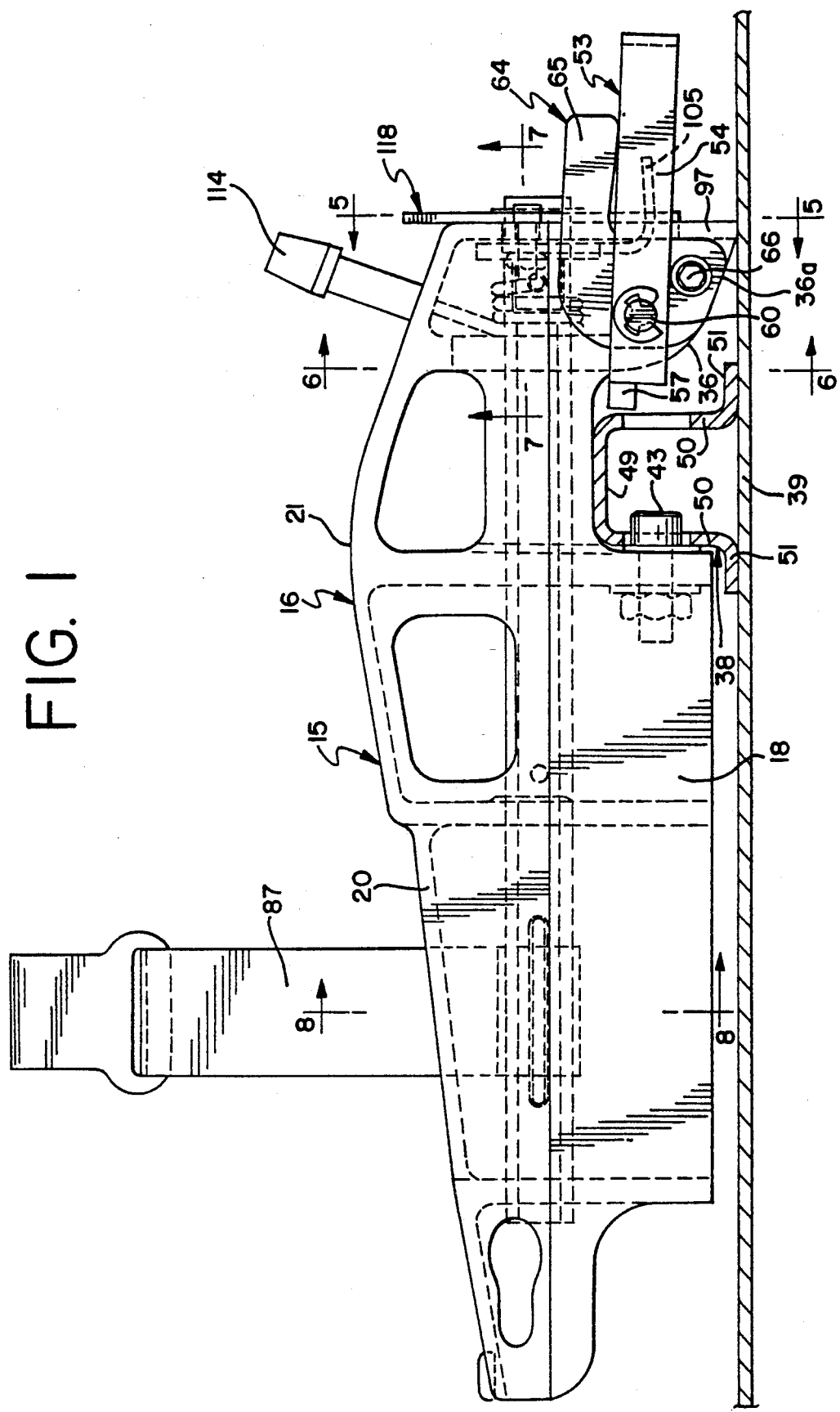
FIG. 1 is a side elevational view of the wheel chock of the present invention in mounted position on the rail of a transportable carrier such as a railway car and illustrating some of the parts in phantom for purposes of clarity.

Referring now to the drawings, and particularly to FIGS. 1 to 3, the wheel chock of the invention, generally indicated by the numeral 15, includes a monolithic body 16 molded of a plastic material having good impact strength over a wide range of temperatures normally encountered by railroads. It will be appreciated that the wheel chock of the invention will generally be used in transportable carriers such as railway cars, including both two-level and three-level auto cars, for the purpose of constraining the vehicles against movement in the cars. Suitable plastics for molding the body 16 are copolymers, such as Xenoy DX 5720 marketed by General Electric Company, and NYRIM 1000 marketed by DSM RIM Nylon Inc. It will be appreciated that other suitable plastic materials may be used.

The wheel chock of the invention is intended to be used by selectively mounting the heel end onto a single rail fastened to the floor of a rail car in chocking position to a vehicle wheel. The chock would extend substantially perpendicular to the rail with the toe end projecting beneath the vehicle so that the chock is disposed in front of or behind a vehicle wheel. It may be appreciated that the rail would be disposed on the outside of the wheel. The chock of the present invention includes a wheel harness strap and mechanism for taking up the strap slack and tightening the strap when it is connected to a wheel harness. In this respect, the chock would be used with another chock of the same type or of a type on the opposite side of the wheel that would merely have one end of the wheel harness attached to the body of that chock.

Figure 6:
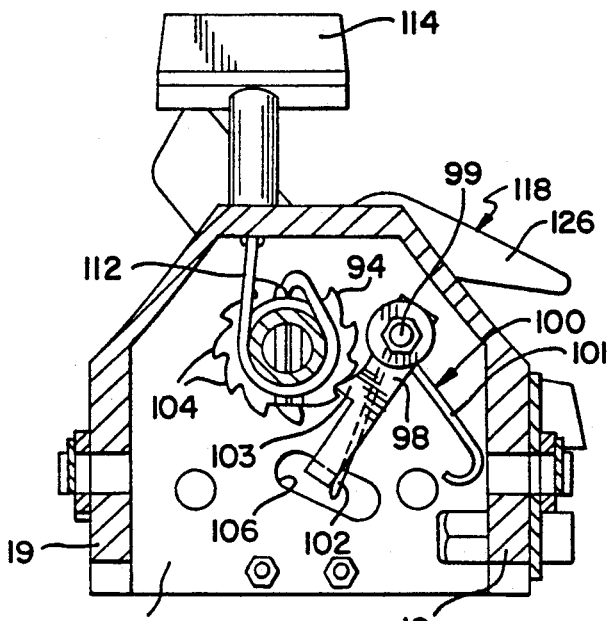
FIG. 6 is a transverse sectional view of the wheel chock of FIG. 1 taken substantially along line 6—6 of FIG. 1.
Figure 8:
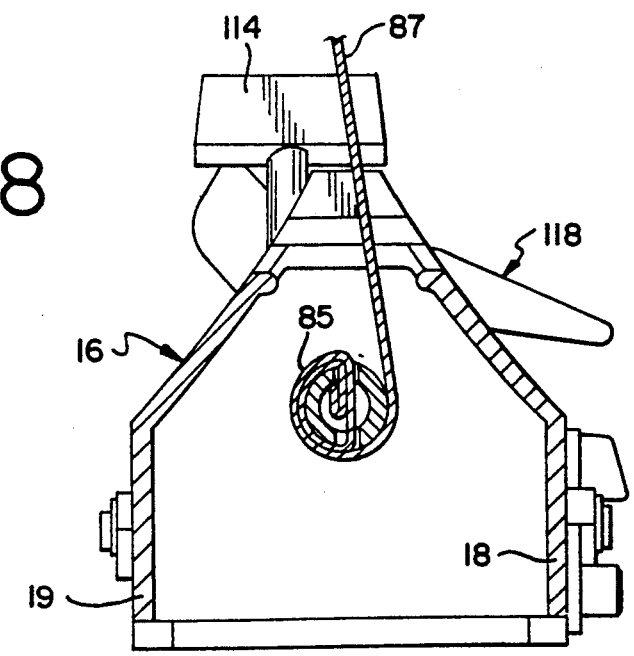
FIG. 8 is a vertical sectional view taken through the chock of FIG. 1 and substantially along the line 8—8 of FIG. 1.

The plastic molded body 16 has a generally open bottom, side walls 18 and 19, as generally seen in FIGS. 6 and 8, and a top defined by a central ridge wall 20, including a domed portion 21 at the highest point, and sloping wheel-engaging wall portions 23 and 24 that slope downwardly to the upper ends of the side walls 18 and 19. The side walls and the sloping walls are symmetrical about the central longitudinal axis of the body which results in a configuration that may be positioned on either side of a vehicle wheel. Each of the sloping wall portions 23 and 24 includes cutouts 26 and 27 which coact with the central ridge to define a handle or hand grips for engaging and manipulating the chock easily by a worker. Each of the sloping wall portions also includes keyhole-shaped openings 28 at the toe end of the body for facilitating the attachment of the chock to a headed pin fastened to the side wall of a railway car when storing between uses. The chock body is generally the same as in U.S. Pat. No. 4,875,813.

As seen most clearly in FIG. 3, the side walls and the sloping wall portions of the body are interconnected by a series of transverse webs that not only maintain the rigidity of the body but also support the torque tube, as described below. As seen in FIG. 3, webs 29 and 30 are of about the same thickness. Web 29 is nearest the toe end of the body, while web 30 is substantially at the center of the body. Spaced from the web 30 and closer to the heel end of the body is web 31 which is thicker than the webs 29 and 30 as it carries the rail pins that coact to lock the chock to the rail car when in mounted position, as will be explained below. A fourth web 32 extends more across the upper end of the body and is joined to web 31 by a pair of longitudinally extending web members 33.

As seen in the side elevational view of FIG. 1, a transversely extending recess 36 is provided at the heel end of the body which opens through the vertical side walls 18 and 19 so that it can receive and be fitted onto a standard hat-shaped-in-cross-section mounting rail 38 that extends longitudinally of the rail car. The rail is suitably fastened to the floor or deck 39. For example, it may be welded or bolted to the floor. The recess includes the horizontal webs 33 at the top and transverse web 31 at the inboard side. As particularly seen in FIG. 1, the lower edge of the body is above the floor or deck 39 when the chock body rests on top of the rail 38. In order to facilitate the ease in mounting of the chock onto rail 38, the outboard side of the recess is cut back as shown at 36a and also for the purpose of providing clearance for the operation of the latching or locking bar, as described below.

In order to secure the chock to the rail 38, the chock includes a pair of cylindrically formed pins 43 mounted on the transverse web 31. The pins are provided with threaded shanks 44 which extend through holes formed in the web 31 and the pins are locked in place by nuts 45. Washers 46 are provided on the pin shanks and against which the nuts are tightened. The pins have a typical head diameter of ¾ inch and are installed on the web with a center-to-center spacing of 2 ¾ inches so that they will fit in holes formed on the rail 38. The rail 38 includes a top wall 49, opposite side walls 50, and attaching flanges 51. The side walls 50 have one-inch holes spaced 2 ¾ inches apart so that the pins 43 of the chock can be adjustably inserted into any series of adjacent holes along the rail during mounting of the chock for restraining a vehicle wheel.

Once the chock is positioned on the rail with the pins engaging in holes on the rail, the chock is locked in place by a locking or latching lever 53. This lever is box-shaped and particularly of a rectangular nature and includes opposed side bars 54 and 55, and a bar 56 that also functions as a handle to be gripped or engaged by a foot during operation of the lever, and a locking bar 57 extending parallel to the handle 56 and movable in the recess 36. A shaft 60 is mounted transverse the body through the side walls at the heel for extending through bores in the locking lever side bars 54 and 55. Retaining rings 61 engage suitable annular grooves at the ends of the shaft 60 for locking the latching lever 53 in place on the shaft 60. Thus, the latching lever is rotatably mounted on the shaft and movable between the locking position as shown in FIG. 1 and an unlocking position where the handle is pulled up and the locking bar 57 is swung downwardly and away from the rail so as to provide sufficient clearance to allow the chock body to be laterally moved to disengage the pins 43 from holes on the rail. Then the chock can be lifted away from the rail.

In order to lock the locking lever 53 into lock position relative to the rail as shown in FIG. 1, a latch 64 including a movable latching head 65 is mounted on the side wall 18 directly against the side wall and between the side wall and the side bar 54 of the locking lever 53. The main body of the latch 64 includes a bore for fitting on the shaft 60 and a second bore through which a locking bolt 66 extends and which fastens the latch to the side wall of the chock body. The latch 64 is made of the same material as the body 16 and is therefore flexible to the extent that the head 65 can be moved inwardly in the direction of the arrow 65a to allow the locking lever 53 to be rotated with the handle portion of the locking lever moving to an upward position to bring the locking bar 57 downwardly into a non-locking position It will be understood that moving the latching lever 53 from a non-locking position to a locking position will only require the pressure of a person's foot to go against the top of the locking lever and push it downwardly whereby it cams the head 65 inwardly and then allows the head to snap back into locking position once the locking lever has swung to the latching position.

As already mentioned, the chock of the invention includes a mechanism for tensioning a wheel harness. While any type of suitable wheel harness could be used for engaging and holding the wheel down to the deck or floor of the railway car, one type of wheel harness is illustrated in FIGS. 10 to 12 and generally indicated by the numeral 70. The wheel harness 70 includes an elongated strap or web 71 having D rings 72 and 73 secured to opposite ends. Additionally, the strap 71 is fitted with a plurality of tire-engaging blocks 74, 75 and 76, each of which includes a longitudinally extending passageway or hole 77 as shown on the block 75 in FIG. 12 through which the strap 71 is threaded. In order to maintain the blocks in spaced relation to each other along the strap, a retaining strip 78 overlies each of the blocks and is suitably fastened to the strap at each end and between each of the blocks, as seen particularly in FIGS. 10 and 11. Each of the blocks 74, 75 and 76 additionally includes a longitudinally extending rib 79 projecting from the underside for engagement in a tread of a tire as illustrated by engagement in the tread groove 80 of the tire 81 in FIG. 12 in order to inhibit lateral movement of the strap along the tread surface of the tire.

The strap 71 and the retaining strip 78 may be made of suitable woven fabric such as nylon having an acceptable strength. For example, the strap 71 may be made of material similar to that used in seatbelts for automobiles and airplanes. The blocks 74, 75 and 76 may be made of a suitable resilient material such as natural or synthetic rubber or any other type of plastic that would enhance the frictional engagement desired when in contact with a vehicle tire.

In operation, once the harness is placed on a vehicle wheel, it is then connected at opposite ends to wheel chocks positioned in front of and behind the tire. One or both of the wheel chocks may have harness-tightening or tensioning capabilities as the wheel chock of the invention, or one of the chocks may merely have a connecting strap for one end of the harness, while the other may have the tightening or tensioning mechanism described below.

The harness-tightening mechanism of the chock of the present invention includes a torque tube 85 longitudinally extending within the chock body 16 and rotatably mounted in the webs 29 and 30, 31 and 32. Thus, the torque tube is mounted in aligned bores formed in the webs, which aligned bores are slightly offset from the center line of the chock body in order to place the wheel harness strap substantially along the center line of the chock when it is being wound on the torque tube. At one end of the torque tube, closely adjacent to the toe end of the wheel chock, the torque tube is slotted at 86 through which one end of a wheel harness strap 87 is threaded and attached to itself so that upon rotation of the torque tube the strap 87 will be wound on the tube, as generally illustrated in FIG. 9.

Figure 7:
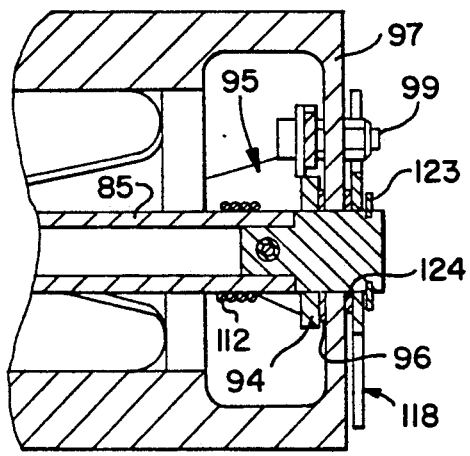
FIG. 7 is a fragmentary longitudinal section view taken substantially along line 7—7 of FIG. 1.

In order to prevent lateral movement of the torque tube in the direction toward the toe end of the chock, a washer 90 is provided on the tube and locked in place by a spring pin 91, as seen particularly in FIG. 3. To prevent lateral movement in the other direction, the ratchet 94 of the pawl and ratchet mechanism 95 bears against a washer 96 on the torque tube at the inside of the end wall 97 of the chock body, as seen in FIG. 7.

The pawl and ratchet mechanism 95 functions to lock the torque tube against movement in one direction and particularly against unwinding of the wheel harness strap 87 after it has been tensioned. The ratchet 94 is suitably welded or otherwise connected to the torque tube and disposed on the inside of the end wall 97. As seen particularly in FIG. 6, a locking pawl 98 is pivotally mounted on the end wall 97 by means of a bolt or shaft 99 and continually biased toward the ratchet 94 by means of a spring 100. The pawl 98 is carried on the shaft 99 and includes an arm 101 that will bottom against the inside of side wall 18 and an arm 102 that engages the pawl 98. The pawl 98 includes a tooth 103 that coacts with a plurality of ratchet teeth 104 when the torque tube is rotated in a clockwise direction as looking at the tube in FIG. 6. The free end of the pawl 98 includes an arm 105 that projects through a hole 106 in the end wall 97 for purposes of applying a release pressure to the pawl during unwinding of the wheel harness strap 87.

During initial mounting of the wheel chock on the rail 38 and against a vehicle wheel, it is necessary to take up the slack of the wheel harness strap 87 before applying a tensioning pressure to the strap. The outer end of the strap has attached thereto a metal hook 108 that connects to a metal D ring of the wheel harness. Heretofore, the slack was taken up by a wrench which was inserted into a socket formed in the heel end of the torque tube. The present invention eliminates the need for a socket.

A unique feature of the present invention for taking up the slack includes a ripcord or flexible line 112 that is fastened at one end to the torque tube, wound around the torque tube, threaded through an opening 113 in the top of the chock body, and provided with a handle 114 that can easily be gripped for applying a force to the ripcord. Thus, it can be appreciated that the person can easily grip the handle 114, pull on the ripcord and cause unwinding of the ripcord and at the same time rotation of the torque tube in a direction to wind the wheel harness strap onto the torque tube and take up the slack of the wheel harness strap 87.

As already mentioned, it is not necessary to use a separate tool for taking up the slack of the wheel harness strap or tensioning the strap as another unique feature of the present invention includes the use of a foot-operated lever 118 for tensioning the strap by driving the torque tube in a direction to additionally wind the strap onto the tube.

Figure 5:
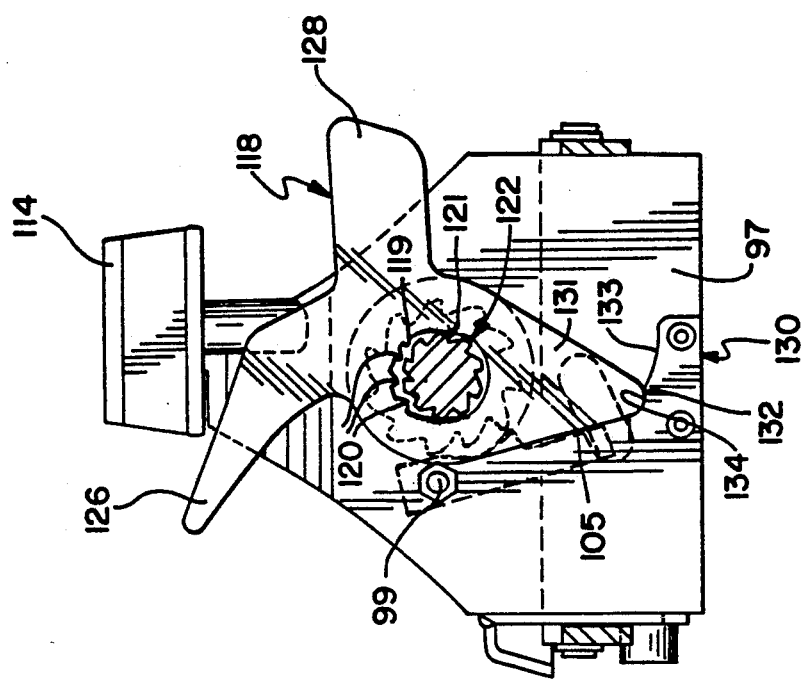
FIG. 5 is a detailed view partly in section taken substantially along line 5—5 of FIG. 1.
Figure 4:
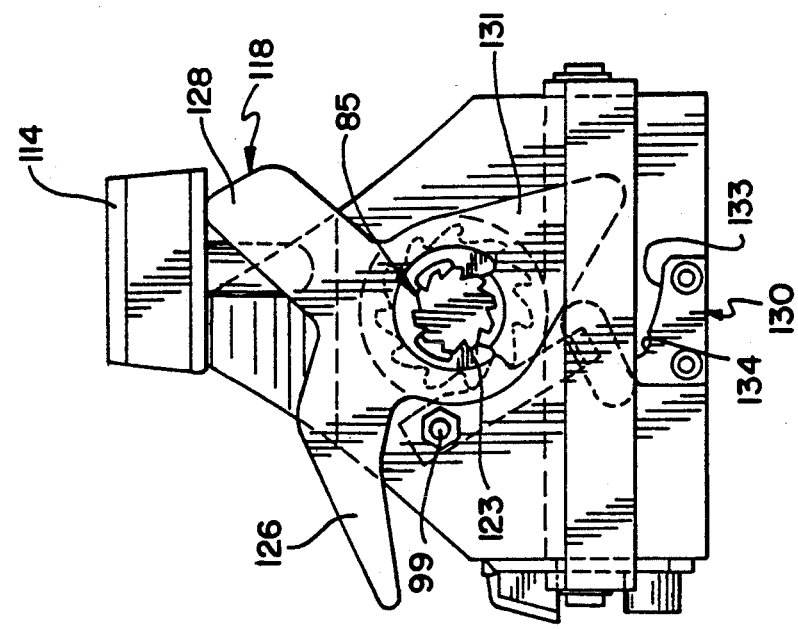
FIG. 4 is an end elevational view of the wheel chock of FIG. 1 looking at the heel or rail-attaching end of the chock.

The foot-operated lever 118 includes a centrally disposed opening 119 that is generally slot-shaped or oval and includes at the upper side a plurality of inwardly extending driving teeth 120 that coact with driven teeth 121 of a driven ratchet 122 formed on the heel end of the torque tube, as seen particularly in FIGS. 4, 5 and 9. It will be appreciated that the heel end of the torque tube which includes the ratchets 94 and 122 may be made with a solid shaft having a stub insert fitting into the tube and locked in place by a rollpin as shown. Also, the end of the ripcord may extend through the rollpin and knotted to be anchored to the tube. Thus, pivotal movement of the foot-operated lever 118 in a counterclockwise direction, as viewed in FIGS. 4 and 5, will cause engagement of the lever teeth 120 with the torque tube ratchet teeth 121 and rotation of the torque tube in a counterclockwise direction for winding of the wheel harness strap 87. The foot-operated lever is retained on the end of the torque tube by a retaining clip 123 that engages a groove formed in the torque tube. In order to prevent the lever from bearing against the end wall 97 which is plastic, a washer 124 is provided on the torque tube between the lever and the end wall, as seen in FIG. 7. For purposes of actuating the foot-operated lever, a foot-operable arm or pedal 126 extends beyond the body of the chock, as seen particularly in FIGS. 4 and 5, and which also coacts with the shaft 99 which serves as a stop so that the lever has limited movement. It will be appreciated that the foot-operated lever may be returned to a position for re-engaging the ratchet 122 and further rotation of the torque tube shaft by applying reverse foot pressure to the arm 126 to rotate the lever counterclockwise.

The foot-operated lever also includes a generally radially extending arm or pedal 128 that is radially spaced from the arm 126 and operable to disengage the pawl 98 from the torque tube ratchet 94 when desiring to release the tension on the wheel harness strap 87.

A metal cam plate 130 is secured to the end wall 97 of the chock body. This cam plate coacts with a lobe 131 formed on the foot-operated lever 118. The lobe 131 extends downwardly and includes a rounded end 132 for engagement with an upwardly sloping cam 133 on the cam plate that terminates in an indent 134. As the rounded end 132 of the lobe 131 engages the cam 133, the foot-operated lever is forced upwardly to disengage the teeth 120 of the lever from the ratchet 122, thereby disconnecting the lever from the torque tube to allow unwinding of the wheel harness strap 87. Once the lobe engages the indent 134, the foot-operated lever retains that position until a force is applied to cause it to pivot counterclockwise. In that indent position, the lever is completely disengaged from the ratchet 122 of the torque tube shaft to allow free rotation of the shaft because the lobe 131 also engages the pawl release arm 105 and moves the pawl to a disengaging position from the ratchet 94. When it is again desired to lock up the tension on the wheel harness strap 87, the foot-operated lever is rotated to release the pawl so that it will engage the ratchet 94 and again hold the shaft once it is rotated to wind up the strap 87. It should also be appreciated that the foot-operated lever 118 could be used to take up the slack of the wheel harness strap, although such a procedure would normally require more time than to do so by using the ripcord. Further, the pedal 128 can be used as an alternative to pedal 126 to return the lever 118 to a position for reengaging the ratchet 122 in tensioning the strap 87.

As already mentioned, the chock of the invention is intended to be used in sets where a pair of chocks coacts with an over-the-wheel harness for not only resisting forward and backward movement of the vehicle but also resisting movement due to bouncing which may cause the vehicle to override a chock. Accordingly, a pair of chocks and the wheel harness operate together to restrain movement of the vehicle against movement forward and backward and upward.

A simple procedure is followed when installing the chocks for restraining a vehicle wheel. For a particular wheel a chock of one set is placed and locked on the mounting rail 38 in a position ahead of or in front of the wheel and another chock is placed and locked on the mounting rail in a position behind the wheel. The harness is draped over the wheel and then connected to the chock straps. If the chocks are identical and both include wheel harness strap take-up mechanisms, the hooks on the straps will be connected to the D-rings on the harness. Locking arms 53 would be actuated to lock the chocks on the rail against lateral movement. The installer would then use the ripcords to take up the slack in the wheel harness straps. Finally, to complete installation, the foot-operated lever 118 would be actuated to rotate the torque tubes and apply tension on the harness so that the harness is snug on the wheel. All of these operations may be performed from the outboard side of the rail 38 without requiring the worker to reach beneath the vehicle. This enhances worker safety.

Similarly, removal or dismounting of the chocks is quick and easy where the worker would actuate the foot-operated lever 118 to release the torque tube and remove the tension from the wheel harness strap. The straps would then be unhooked from the D-rings of the harness followed by swinging the locking arms upward to unlatching position. Then the chocks can be laterally shifted to disengage from the chock rail and stored pending further use.

Although it is generally contemplated that the chock of the invention be used in railway cars, it should be appreciated that the chock may also be employed in over-the-highway truck-type transportable carriers or over-the-water marine-type transportable carriers.

It will be understood that modifications and variations may be effected without departing from the scope of the novel concepts of the present invention, but it is understood that this application is to be limited only by the scope of the appended claims.

the invention is hereby claimed as follows:

1. A wheel chock system for chocking and restraining a vehicle wheel of a motor vehicle in a transportable carrier, wherein the carrier includes a floor having a longitudinally extending rail mounted thereon to which the wheel chock may be selectively mounted, the chock comprising an elongated body of molded flexible material, means on the body coacting with the rail to mount the chock along the rail, and means carried by the body connectible to a wheel harness for tensioning the harness, said tensioning means comprising a longitudinally extending torque tube rotatably mounted in the body, a wheel harness strap having one end connected to said tube for winding thereon and the other end adapted to be connected to one end of the wheel harness to tension the wheel harness on a wheel of the vehicle, ratchet means for locking the tube against rotation in one direction including a ratchet wheel on the tube and a locking pawl pivotally mounted on a first axis on the body, and a foot-operated lever means pivotally mounted on a second axis on the body for engaging said locking pawl, whereby actuation of the foot-operated lever means will release the locking pawl.

2. The wheel chock system of claim 1, wherein said foot-operated lever means further includes means for actuating said torque tube to tighten said harness strap.

3. The wheel clock system of claim 1, which further includes means for rapidly rotating said tube for quick take-up of harness strap slack.

4. The wheel chock system of claim 3, wherein said quick take-up means includes a ripcord wound on said torque tube in a direction opposite to the direction of winding of the strap.

5. The wheel chock system of claim 3, wherein said quick take-up means includes a flexible line connected to the tube and windable thereon for use in taking up any slack in the harness strap when mounting the harness on a wheel.

6. The wheel chock system of claim 2, which further includes means for quick take-up of harness strap slack.

7. The wheel chock system of claim 6, wherein said quick take-up mans includes a ripcord wound on said torque tube in a direction opposite to the direction of winding of the strap.

8. A wheel chock system for restraining a motor vehicle in a transportable carrier, wherein the carrier includes a floor having a rail mounted thereon to be positioned on the outside of a vehicle wheel of the vehicle when the vehicle is in position to be restrained by a wheel chock, the chock comprising an elongated body of molded flexible material, means on the body coacting with the rail to selectively connect the chock to the floor, a longitudinally extending torque tube rotatably mounted in the body, a wheel harness strap having one end connected to said tube for winding thereon adapted to be connected to one end of a wheel harness and to tension the wheel harness on a wheel of the vehicle, ratchet means for locking the tube against unwinding including a ratchet wheel on the tube and a locking pawl pivotally mounted on the body, and foot-operated lever means pivotally mounted on the body including means for actuating said torque tube to tighten said harness strap.

9. The wheel chock system of claim 8, wherein said means for actuating the torque tube includes ratchet means having a driven ratchet on said torque tube and driving teeth on said lever.

10. The wheel chock system of claim 9, wherein the foot-operated lever further includes means for releasing the locking pawl to allow unwinding of said strap.

11. The wheel chock system of claim 9, which further includes means for disengaging the driving teeth from the driven ratchet during unwinding of said torque tube.

12. The wheel chock system of claim 11, wherein said disengaging means includes a camming lobe on the foot-operated lever and a cam on the chock body for disengaging the driving teeth from the driven ratchet.

13. A wheel chock system for restraining a motor vehicle in a transportable carrier, wherein the carrier includes a floor having a rial mounted thereon to be positioned on the outside of a vehicle wheel of the vehicle when the vehicle is in position to be restrained by a wheel chock, the chock comprising an elongated body of molded flexible material, means on the body coacting with the rail to selectively connect the chock to the floor, a longitudinally extending torque tube rotatably mounted in the body, a wheel harness strap having one end connected to said tube for winding thereon adapted to be connected to one end of a wheel harness and to tension the wheel harness on a wheel of the vehicle, ratchet means for locking the tube against unwinding including a ratchet wheel on the tube and a locking pawl pivotally mounted on the body, and means for rapidly rotating said tube for quick take-up of harness slack, wherein said quick take-up means includes a ripcord wound on said torque tube in a direction opposite to the direction of winding of the strap.

14. A wheel chock and restraining system for restraining a motor vehicle in a transportable carrier, wherein the carrier includes a floor having a rail mounted thereon to be positioned on the outside of a vehicle wheel of the vehicle when the vehicle is in position to be restrained by the system, the system including a wheel harness and a pair of wheel chocks, one wheel chock to be at each side of the wheel, each chock having a body of molded flexible material and means for connecting the chock to the wheel harness, at least one of said chocks including a longitudinally extending torque tube rotatably mounted in the body, the means for connecting said one wheel chock to the harness including a wheel harness strap connected to the tube for winding thereon and tensioning the wheel harness on the vehicle wheel, ratchet means for locking the tube against unwinding including a ratchet wheel on the tube and a locking pawl pivotally mounted on the body, and foot-operating lever means pivotally mounted on said body including means for actuating said torque tube to tighten the strap and means to release the locking pawl when removing the harness.

15. The wheel chock system of claim 14, which further includes means for quick take-up of harness strap slack.

16. The wheel chock system of claim 15, wherein said quick take-up means includes a ripcord wound on said torque tube in a direction opposite to the direction of winding of the strap.

17. The wheel chock system of claim 15, wherein said quick take-up means includes a flexible line connected to the tube and windable thereon for use in taking up any slack in the harness strap when mounting the harness on a wheel.

18. The wheel chock system of claim 17, wherein said flexible line includes a handle on the free end.

* * * * *